United States Patent [19]

McKinnon

[11] Patent Number: 4,975,303

[45] Date of Patent: Dec. 4, 1990

[54] SIMULATED MARBLE

[76] Inventor: Gordon McKinnon, 119 S. Oregon Ave., Tampa, Fla. 33606

[21] Appl. No.: 347,865

[22] Filed: May 5, 1989

Related U.S. Application Data

[63] Continuation-in-part of Ser. No. 122,398, Nov. 19, 1987, which is a continuation-in-part of Ser. No. 861,233, May 7, 1986, Pat. No. 4,721,634.

[51] Int. Cl.$^5$ ............... B05D 3/12; B05D 5/00; B05D 1/36
[52] U.S. Cl. .................. 427/263; 427/264; 427/268; 427/309; 427/348
[58] Field of Search ............ 427/263, 268, 273, 274, 427/281, 348, 199, 309, 264

[56] References Cited

U.S. PATENT DOCUMENTS

| | | | |
|---|---|---|---|
| 3,341,396 | 9/1967 | Iverson | 427/268 X |
| 3,712,825 | 1/1973 | Yocum | 427/264 |
| 4,721,634 | 1/1988 | McKinnon | 427/263 |

FOREIGN PATENT DOCUMENTS 2452976  12/1980  France .

OTHER PUBLICATIONS

Translation of French Patent No. 2452976, PTO-90-1427, U.S. Patent and Trademark Office, Jan. 1990.

*Primary Examiner*—Evan Lawrence
*Attorney, Agent, or Firm*—Frijouf, Rust & Pyle

[57] ABSTRACT

A process for covering a substrate with a textured simulated marble surface and the resulting product. Cement and sand are mixed to form a first mixture to which is added an aqueous solution of an adhesive resin such as an acrylic resin to create a mortar. The mortar is spread on the substrate and one or more color pigments are added to the surface at randomly-spaced locations prior to the complete curing of the mortar. Air is blown onto the surface of the mortar and serves to blend the color pigments into the mortar and into each other. As the air stream moves across the surface of the mortar, color patterns are formed.

24 Claims, 4 Drawing Sheets

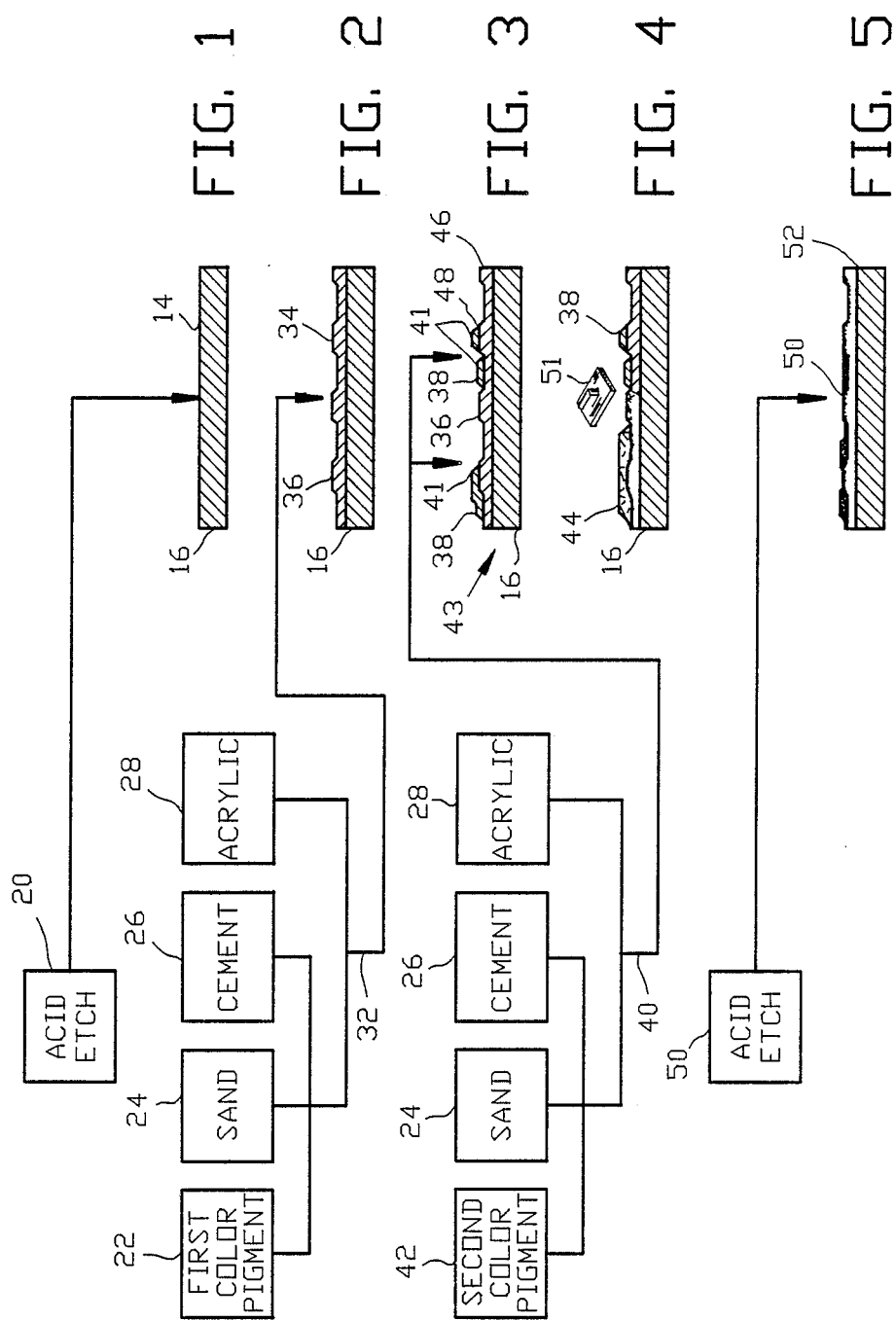

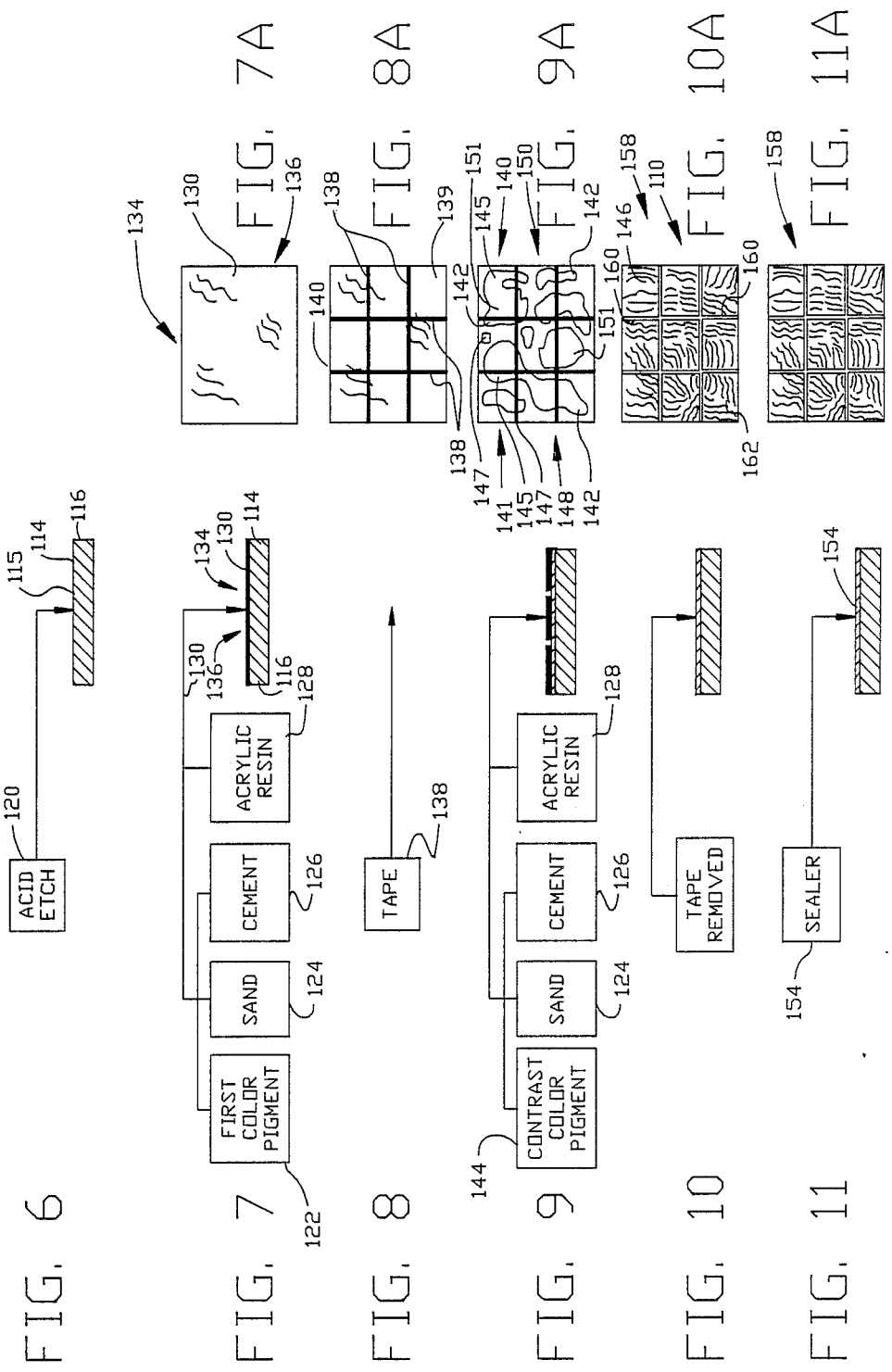

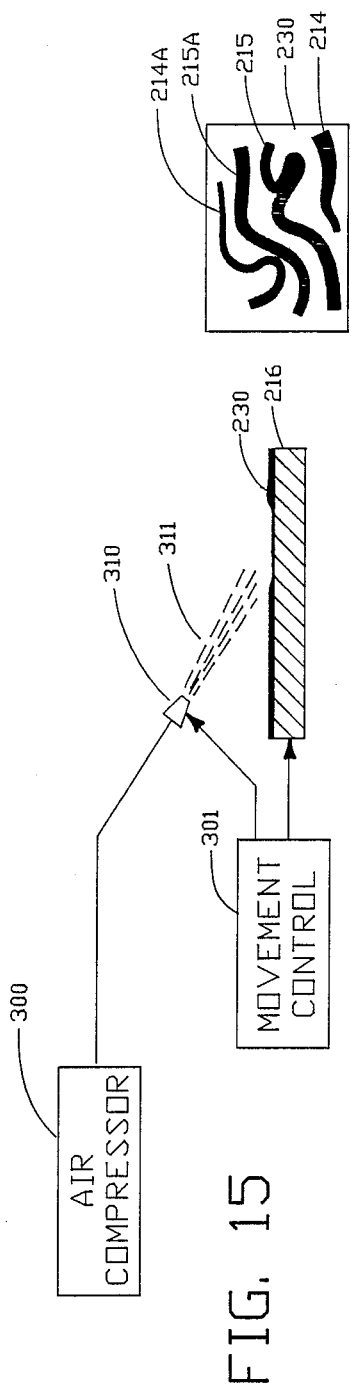

SIMULATED MARBLE

RELATED APPLICATION

This application is a continuation-in-part of application Ser. No. 122,398, filed Nov. 19, 1987, which in turn is a continuation-in-part of application of Ser. No. 861,233 filed May 7, 1986, now U.S. Pat. No. 4,721,634, the disclosures of which are incorporated herein by reference as if fully set forth herein.

BACKGROUND OF THE INVENTION

1. Field of the Invention

This invention relates to cementitious coating of a surface, and more particularly to making a textured simulated marble surface and the method of texturing the surface.

2. Information Disclosure

Various methods have been devised by the prior art for producing simulated brick, tile and the like. One method of producing simulated bricks or tiles, for example, involves preparing a mixture of cement, water and water-based adhesives having a consistency of mortar which is applied to a wall or floor then allowed to partially set. Scoring indentations are made to remove cement after which mortar is placed in the indentations to produce the desired simulated brick appearance.

Another method utilizes a straight edge tape releasably attached to a substrate in the form of square or rectangle grout lines. A covering over the entire substrate is applied over the taped substrate. After curing, the tape is removed from the substrate to reveal simulated grout lines.

A popular method of coating concrete driveways, pool decks, walls and the like involves coating the surface with a color or pigment composition. These compositions are available as cement water paint, alkyd-type enamel, resin-emulsion paint, oil paint, rubber-base paint, polyvinyl acetate emulsions, polyester paint, epoxy paint and silicon sealers. These compositions, however, do not produce either a ceramic-like or a marble-like appearance.

Another method of color enhancing concrete involves mixing color pigments, either natural or synthetic, into the dry cement powder beforehand or by dusting it on afterward. When the color pigment is added to the dry cement mix, the color pigment is preferably put through a sieve to insure even blending. If the surface is not too large such that the mortar will set before finishing, the color pigment may be applied by "dusting" the color pigment onto the concrete slab after floating. Here the pigment is mixed with fine sand and scrubbed into the wet surface with a stiff brush and smooth troweled. These methods sometime result in an uneven or blotchy color and/or a color which looks faded in dry weather. These compositions, also fail to produce a coating simulating a marble or ceramic surface with color gradations.

Therefore, it is an object of this invention to provide an economical process of preparing a durable cementitious coating having a ceramic appearance or a durable cementitious coating having a simulated marble appearance.

Another object of this invention is to provide a process of preparing a cementitious marble-like or a cementitious ceramic-like surface which provides a tough surface which hardens to a marble-like or a ceramic-like surface, respectively, suitable for heavy pedestrian traffic.

Another object of this invention is to provide a process of preparing a simulated marble surface or a ceramic like surface which provides a tough surface which hardens to a surface suitable for heavy pedestrian traffic.

Another object of this invention is to provide a process of preparing a ceramic-like cementitious surface or marble-like cementitious surface which provides excellent adhesion to the substrate.

Another object of this invention is to provide a process of preparing a ceramic-like cementitious surface or marble-like cementitious surface which is skid resistant.

Another object of this invention is to provide a process of preparing a ceramic-like cementitious surface or marble-like cementitious surface which provides a clear intermix of contrasting and background colors suggestive of a ceramic surface or a marble surface, respectively.

Another object of this invention is to provide a process of preparing ceramic-like cementitious surface or marble-like cementitious surface where the selection of the contrasting colors is a matter of choice.

Another object of this invention is to provide a process of preparing cementitious surface which is structurally durable for surfacing driveways, pool decks and the like.

Another object of this invention is to provide a process of preparing ceramic-like cementitious surface or marble-like cementitious surface that may be applied to new or existing substrates to produce a simulated mottled and speckled ceramic surface having a speckled color gradation or to produce a marble-like surface, respectively.

Another object of this invention is to provide a process of preparing a marble-like surface without final surface troweling.

The foregoing has outlined some of the more pertinent objects of the invention. These objects should be construed to be merely illustrative of some of the more prominent features and applications of the invention. Many other beneficial results can be attained by applying the disclosed invention in a different manner or modifying the invention within the scope of the disclosure. Accordingly, other objects and a fuller understanding of the invention may be had by referring to the summary of the invention an the detailed description describing the preferred embodiments in addition to the scope of the invention which is defined by the claims taken in conjunction with the accompanying drawings.

SUMMARY OF THE INVENTION

The invention is defined by the appended claims with a specific embodiment shown in the attached drawings. For purposes of summarizing the invention, the invention may be incorporated into a process of preparing a simulated marble surface and the product produced thereby. The process for covering a substrate with a simulated marble surface comprises mixing cement and sand to form a mixture to which is added an aqueous solution of an adhesive resin, such as an acrylic resin, to create a liquid mortar. The liquid mortar is applied to the substrate to form a textured coat on the substrate. One or more liquid color pigments are added to the surface of the mortar at randomly spaced intervals prior to the complete curing of the liquid mortar. An air stream is directed across the surface of the liquid mortar and serves to blend the color pigments into the mortar and into each other. Color patterns of a random nature are formed as the air stream, causes the liquid color pigments to move about in the liquid mortar. The colors blend and fade as they swirl through the liquid mortar giving a natural appearance to the resulting product. The final product cures smooth without the need for troweling.

In another embodiment of the invention the liquid mortar is of a viscosity capable of being sprayed through a spray gun to enable liquid to be applied by spraying. Preferably, the liquid mortar is applied by spraying using a spray texture gun such as a Kraft Texture Gun which mixes the mortar and air to produce a textured surface by spraying. Preferably, the mortar is sprayed through a small bore air tip to provide a fine textured appearance. The color pigments can then be added, either by spraying or by dipping a paddle of color pigment into the surface; and the air gun then used to mix, or swirl, the pigments. The liquid mortar is swirled about by an air pressure of approximately fifteen pounds per square inch (15 psi).

An optional protective clear coating may be applied to the simulated marble surface to prevent premature aging of the simulated marble surface. Generally, the clear coating includes sun screens to protect against color fading and sealants to provide water resistance to the simulated marble surface. The clear coating is selected from acrylic, epoxide, or polyurethane and the like based coatings containing sun screens and sealants known in the art. The application of a clear coating to the surface provides protection to the simulated marble surface without interfering with the inherent skid resistance of the simulated marble surface. Skid resistance is desired in an outdoor or wet location. Application of a large number of clear coats tends to level the surface of the simulated marble and to reduce or possibly eliminate the skid resistance of the simulated marble surface.

The preferred substrate is concrete. However, where the concrete surface is older than about 24 hours from the time the substrate concrete was poured, the substrate concrete must be acid-etched prior to applying the first liquid mortar. This insures a bonding between the concrete and the first liquid mortar of the lower layer. The preferred acid to degrease and etch concrete is hydrofluoric acid.

The liquid color pigments are chosen such that they are in a solution, chemically compatible with the liquid mortar. Thus, when the liquid mortar is acrylic based, then the pigments should be acrylic compatible. The pigments can be added by hand, by dipping a paddle or other suitable devices in a vat or just below the surface of the liquid mortar. The pigments can be air-blown on the liquid mortar surface if care is taken not to inject the color too far into the liquid mortar. Also, color pigments can be dropped on the surface from above, all at random intervals and in random quantities.

Preferably, the cement used to prepare the mortar is portland cement and the most preferred cement is white portland cement since it produces the most color brilliance and generally requires less pigment than the darker cements to produce a desired color.

For purposes of summarizing another use, the invention may be incorporated into a process of preparing or repairing a roof structure. The process for preparing a roof structure over such substrates as plywood, with abutting joints being preferably taped, shingles, roll roofing, built-up roofing, etc., is to apply a roof coating composition comprising a mixture of concrete, sand, reinforcement fiber and an acrylic resin on to the substrate surface. The covering of the invention yields certain advantages not available in asphalt based products. For example, polystyrene panels, which can be optionally shaped to such forms as barrel tile, etc., can be coated with the composition to provide a durable roof structure. Also, the covering composition can be used to repair a built-up roof by first removing the gravel and debris from the roof deck and applying the roof coating composition over the built-up roof. The coating composition is applied an amount of about 200 lbs/square. The use of this composition results in a decrease of about 500 lbs/square since the gravel which has been removed weights about 700 lbs/square.

The process of preparing a roof structure comprises the steps of preparing a roof coating composition by mixing cement, sand and reinforcement fiber to form a first mixture. An aqueous solution of acrylic resin is added to the first mixture to create a first fibered liquid mortar. The first fibered liquid mortar is applied onto the roof deck to form a contiguous coating of first fibered liquid mortar over the roof deck. The first fibered liquid mortar coating is allowed to partially cure to form a roof structure. Color pigments are added to the partially cured mortar and air brushed around the surface of the mortar.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 schematically illustrates the acid etching of the substrate prior to applying the simulated marble surface;

FIG. 2 schematically illustrates the application of the first liquid mortar onto the acid etched surface of FIG. 1;

FIG. 3 schematically illustrates the application of the second liquid mortar onto the surface of the first liquid mortar as illustratively applied at FIG. 2;

FIG. 4 schematically illustrates the first and second liquid mortar coats being troweled;

FIG. 5 schematically illustrates the application of a sealant onto the coated surface of FIG. 4;

FIG. 6 schematically illustrates the acid etching of a cementitious substrate, such as concrete, prior to applying a first liquid mortar to the surface of the substrate;

FIG. 7 schematically illustrates the application of the first liquid mortar onto the acid etched surface of FIG. 6;

FIG. 7A is a plan view of FIG. 7;

FIG. 8 schematically illustrates the application of the strips of tape onto the surface of the cured first liquid mortar;

FIG. 8A is a plan view of FIG. 8;

FIG. 9 schematically illustrates the random application of the second liquid mortar onto at least about 60% of the entire surface of the taped and cured first liquid mortar to yield a noncontiguous thickened coating thereon;

FIG. 9A is a plan view of FIG. 9;

FIG. 10 schematically illustrates the removal of the tape from the cured surface;

FIG. 10A is a plan view of FIG. 10;

FIG. 11 schematically illustrates the application of a sealant onto the coated surface of FIG. 9;

FIG. 11A is a plan view of FIG. 11;

FIG. 15 schematically illustrates the application of air to move the color through the mortar;

FIG. 15A is a plan view of FIG. 15;

FIG. 16 schematically illustrates the application of a sealant onto the colled substrate and FIG. 16A is a plan view of FIG. 16;

Similar reference characters refer to similar parts throughout the several views of the drawings.

DETAILED DESCRIPTION

Figure 13A:
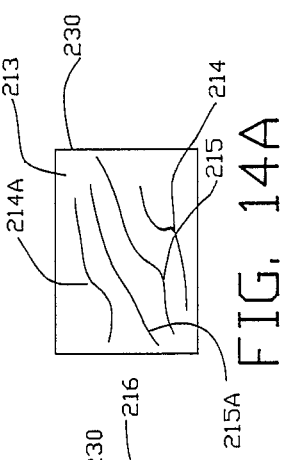
FIG. 13A is a plan view of FIG. 13.

The present invention discloses a process which is suitable for applying over new or existing substrates a new surface which simulates a marble appearance.

FIG. 1 schematically illustrates the application of the acid-etch composition 20 onto the surface 14 of a concrete substrate 16. The acid-etch composition comprises an aqueous solution of hydrofluoric acid which is used to degrease and otherwise prepare the concrete substrate to accept and bond the first liquid mortar.

FIG. 2 schematically illustrates the components of the first mixture namely, sand 24, cement 26 and optionally a first color pigment 22. Sand, as used in the described inventions herein, includes any fine aggregate material known to those skilled in the concrete making art. To this mixture is added an aqueous solution of an acrylic resin 28 to prepare a first liquid mortar 32. The mortar is preferably sprayed onto the previously acid-etched surface 14 set forth at FIG. 1. The first liquid mortar is sprayed such that the resultant surface appearance is textured in character 34 forming a first coat 36. In the event that a myraid of colors is desired, a plurality of single mixtures of cement and sand may be individually prepared to form a plurality of liquid mortars when the aqueous solution of an adhesive resin is added to the each single mixture of the plurality of mixtures to create a plurality of single mixtures of liquid mortars. A contrasting pigment selected from a plurality of contrasting pigments is added to at least one of the single mixtures of the plurality of liquid mortars such that the resulting pigment color of the single mixture liquid mortar contrasts with the other liquid mortars. The plurality of liquid mortars is then divided into a first portion of single mixture liquid mortars and a second portion of single mixture liquid mortars. Each single mixture of the first portion of liquid mortars is individually applied onto the substrate to form a first textured coat on the substrate. As schematically indicated at FIG. 2, the first coating should not be too thick such that the individual colors of the liquid mortars would be lost in the thickness. Each single mixture of the second portion of liquid mortars is then individually applied onto randomly spaced portions of the first textured coat prior to the complete curing of the first textured coat to enable the first and second coatings to form a unitary textured covering for the substrate with the contrasting pigments being randomly spaced in the textured unitary covering with the textured unitary coating having a lower layer and an upper layer with the lower layer comprising the first and second portions of liquid mortar and the upper layer comprising the second portion of liquid mortars such as illustrated at FIG. 3. The liquid mortars are individually applied in order to insure that each color brilliance is not blended to any detrimental extent prior to application. The contrasting pigments in the liquid mortars are allowed to commingle with the other of the liquid mortars and the pigmented areas to blend with the non-pigmented areas such as illustrated at FIG. 4. The non-pigmented areas are those liquid mortars without a contrasting pigment. The blended upper layer of the unitary textured covering of the substrate is troweled to simulate a marble surface having contrasting pigments such as illustrated at FIG. 5. As a practical matter only one liquid mortar without a color pigment is used in each first portion and second portion of liquid mortars if such nonpigmented mortar is used.

FIG. 3 is a schematic illustration of the application of the second liquid mortar 40 onto the surface of FIG. 2 which illustrates the previously applied first liquid mortar 34. The second liquid mortar contains the same components of the first liquid mortar 32 and optionally a contrasting color pigment 42. The second liquid mortar 40 is applied to randomly spaced portions 41 of the first coating 36 prior to the compete curing of the first coating to form a second coating 38. This enables the first and second coatings to form a unitary textured coating 43 covering for the substrate with the contrasting pigment being randomly spaced in the textured unitary covering. As illustrated in FIG. 3, the textured unitary coating forms an upper layer 48 and a lower layer 46. The lower layer 46 comprises the first 32 and second 40 liquid mortars and the upper layer comprises the second liquid mortar 40. Portions of the second liquid mortar 40 fall into the lower layer 46 as well as comprise the upper layer 48. The thickness of the first and second coating together ranges from about ⅛" to ¼", with each coat having essentially the same thickness.

FIG. 4 schematically illustrates the contrasting pigment 44 in the one of the first 32 and second 40 liquid mortars commingling with the other of the first and second liquid mortars to enable the pigmented areas to blend with the non-pigmented areas. A trowel 51 is illustrated troweling substantially only the upper layer 48 (discussed in greater detail below) to result in a textured simulated marble surface.

FIG. 5 schematically illustrates the application of a sealer 50 to the cured surface 52. The sealer protects the secured simulated marble surface by including sunscreens, sealants and the like in the composition.

Preferably, the proportions of the components of the first and second mixtures are about 1 part cement to about 2 parts sand. The preferred cement is portland cement and the most preferred portland cement is white portland cement since portland cement produces the most color brilliance and requires less pigment than the darker cements. Masonry cement may be used, however, it contains lime which may weaken the resulting surface. A complete mixture of sand and cement is available from Seamco Laboratories under the trademark FLO-CRETE and is the most preferred mixture.

Aqueous solutions of adhesive resins are commercially available. The preferred adhesive resin is an aqueous solution of an acrylic resin readily available from Union Carbide available under the trademarks UCAR 503, UCAR 380 and UCAR 505 and from Rohm and Haas available under the trademarks RHOPLEX AC64, AC 490 and AC 507. An aqueous adhesive resin is also available from Seamco Laboratories.

The colorants are readily available from Nuodix, G P Colortund, Universal Color Dispersion Co., Cardinal Color Co. and UCD Universal Colorant and from other suppliers known in the art.

The sand and cement are mixed with the aqueous solution of the resin in a ratio of about 10 pounds of resin solution to about 50 pounds of sand and cement mix which gives a fluid consistency or flowability of a thick pancake batter to the mortar. If the mortar has a greater flowability (less viscous) the resultant coating has a smoother texture. If the mortar has less flowability (more viscous) the resultant coating has a courser texture. The mortar, which may include a colorant, is completely mixed to insure complete dispersion of the ingredients such that the resulting mortar will pour or spray without separation of the ingredients.

By way of example and for illustration the process for covering an existing concrete slab, such as a driveway, includes cleaning the surface of the concrete slab by degreasing and preparing the surface for bonding by applying an acid-etching solution to the surface of the concrete. An aqueous solution of hydrofluoric acid is preferred. This solution is diluted with water up to about 3:1 (water to acid), or used full strength, and evenly applied to the slab surface in a manner well known to those in the art. The spent acid solution is then washed off by spray washing the surface with water, forced upon the surface under combined water and air pressure to provide an enhanced cleansing action upon the surface. The first liquid mortar may be applied to the surface of the concrete while it is still damp thereby enhancing the bonding between the concrete and the mortar. The mortar may also be applied to a dry surface.

Portland cement, preferably white portland cement, and sand, specifically mortar sand which is a very fine powder-like sand, is mixed at the preferred ratio of 2 parts sand to 1 part cement forming a first mixture. A second mixture is prepared the same way as the first except that a contrasting color pigment, for example black, is added to contrast the second mixture. An aqueous solution of acrylic resin is then added at a ratio of about 10 pounds of resin solution to about 50 pounds of sand and cement mix to both the first and second mixtures to prepare a first and second liquid mortar, respectively.

The first liquid mortar is sprayed onto the concrete surface using a Kraft Texture Gun, at about 15 psi pressure, which mixes the mortar and air producing a textured coat, designated the first coating, of the first liquid mortar over the entire surface of the concrete slab. The resultant sprayed surface or coat may be best described as a plurality of separate "plateaus" upon a flat lower region. This coat is known as the lower layer.

Prior to the complete curing of the first liquid mortar the second liquid and pigment containing mortar is then randomly sprayed onto the concrete surface using a Kraft Texture Gun. The second liquid mortar is preferably applied at a higher pressure, about 20-22 psi, than the first liquid mortar to enhance blending and commingling. This coat, designated the second coating, may be best described as a plurality of overlying "plateaus" randomly placed upon the previously applied first coat or liquid mortar. The second liquid mortar "plateaus" fall upon the sprayed first coat at: (1) "plateaus" of the first coat, (2) flat lower region of the first coat, and (3) partially on the "plateaus" and partially on the flat lower region of the first coat. Only those "plateaus" of the second liquid mortar which are resting upon the the "plateaus" of the first liquid mortar are considered comprising the upper layer. Where a plurality of liquid mortars having contrasting pigments are applied, care must be taken to retain the distinction between the lower layer and the upper layer such that the troweling of the upper layer can achieve the textured appearance indicative of marble. The textured appearance is achieved by not troweling to any substantial extent into the lower layer so as to obliterate the lower layer although some troweling into the lower layer, such as by bulldozing a small portion of the upper layer over the lower layer, may be unavoidable to attain a troweled and flattened upper layer. Extensive troweling into the lower layer would result in a smooth surface without the "voids" in the troweled upper layer which permit the untroweled lower layer to present its textured appearance to the viewer and hence its marbleized appearance. A totally smooth upper layer which is absent any "voids" in the upper layer would not present a marble-like surface having a textured appearance. Therefore, substantially only the resultant blended upper layer is troweled to reveal blended-streaky alterations of light and dark to simulate a textured marble surface which may be described as lightly troweling the upper layer.

The contrasting pigments are allowed to commingle with the non-pigmented areas indicated by a blending about the periphery or boundary of the pigmented and non-pigmented areas. Blending occurs in both the lower area and upper area. Temperature and humidity influence the curing rate. Thus, the greatest extent of blending is achieved at low temperatures and high humidity because of the delayed curing.

The simulated marble surface may be coated with a protectant coating, such as an epoxy based coating, as soon as the applied surface hardens or cures. While the time for curing is dependant upon temperature and humidity, generally about 20 minutes after trowelling is sufficient.

PINK-GRAY-WHITE SIMULATED TEXTURED MARBLE SURFACE

White portland cement, and mortar sand is mixed at the preferred ratio of 2 parts sand to 1 part cement to form a first mixture. A second mixture is prepared the same way as the first except that a pink color pigment (AQI 2199 red oxide Cardinal Color Co.) is added to the second mixture at about 1 fluid ounce (by volume) for each 50 pounds sand and cement mix prepared. A third mixture is prepared the same way as the first except that a black color pigment (AQI 9104 black iron oxide Cardinal Color Co.) is added to the third mixture at about 1 fluid ounce (by volume) for each 50 pounds sand and cement mix prepared. An aqueous solution of acrylic resin is added at a ratio of about 10 pounds of resin solution to about 50 pounds of sand and cement mix to each of the first, second and third mixtures to prepare a first (white), a second (pink) and a third (gray) liquid mortar, respectively.

The first liquid mortar is sprayed onto the concrete surface using a Kraft Texture Gun, at about 15 psi and an air tip bore of 3/32 inch, which mixes the mortar and air producing a textured coat, designated the first coating, of the first liquid mortar over the entire surface of the wood test piece. Prior to the complete curing of the first liquid mortar, the second liquid pigment containing mortar and the third liquid pigment containing mortar is randomly sprayed onto the coated wood surface using a Kraft Texture Gun at about 20-22 psi and an air tip bore of ⅛ inch. The pink and gray pigment is allowed to commingle with the non-pigmented areas for about 5 minutes. The upper layer is troweled to reveal the blended-streaky alterations of white, gray and pink to simulate a textured marble surface. About 20-23 minutes after troweling, the surface is cured enough to be coated with an epoxy based coating. Strips of tape may also be used in the manner described to attain the ceramic tiled appearance in the preparation of a marbleized tiled surface by forming grout lines upon removing the strips of tape to present a marbleized tiled appearance.

In a further process which is suitable for applying over new or existing substrate a new surface which simulates a ceramic appearance or a ceramic tile having a mottled, speckled appearance.

FIG. 11 schematically illustrates the application of the acid-etch composition 120 onto the surface 114 of a concrete substrate 116. The acid-etch composition comprises an aqueous solution of hydrofluoric acid which is used to degrease and otherwise prepare the concrete substrate to accept and bond the first liquid mortar.

FIGS. 7 and 7A schematically illustrate the application of the first liquid mortar 130 onto the acid-etched surface 114 of FIG. 11. The components of the first mixture namely, sand 124, cement 126 and optionally a first color pigment 122 are completely mixed together to insure homogenous dispersion of the components. To this mixture is added an aqueous solution of an adhesive resin such as an acrylic resin 128 to prepare a first liquid mortar 130. The resulting first liquid mortar 130 is prepared with enough resin such that is has the consistency of water or of a low viscosity to enable application onto the surface 114 of the concrete substrate 160 with a sponge, squeegee or the like. The mortar is preferably squeegeed onto the previously acid-etched surface 114 set forth at FIG. 6. The first liquid mortar 130 is applied such that the resulting surface is substantially smooth 134 and forms a cured first coat 136. In the event that the cementitious substrate 115 is of the desired color, the application of a first liquid mortar onto the surface of the cementitious substrate is not required. The second liquid mortar may then be applied directly to the cementitious substrate to produce the desired appearance of the invention.

FIGS. 8 and 8A schematically illustrate the application of the strips of tape 138 onto the surface of the cured 140 first liquid mortar 130 as illustratively applied at FIG. 7. In the event a first liquid mortar 130 is not applied, the strips of tape 138 are applied directly to the cementitious substrate 115 prior to applying the second liquid mortar 142. The step of applying strips of tape 138 may be omitted with a contiguous ceramic appearance is desired rather that a ceramic tiled appearance.

Strips of tape may also be used in the manner described to attain the ceramic tiled appearance in the preparation of the marbleized tiled surface by providing grout lines to present a marbleized tiled appearance. However, in the marbleized surface the tape should be set down before application of the first liquid mortar or application of the first portion of liquid mortars since the layer to which the straight edge tape is releasably secured to should be stable, i.e., cured. On very small areas it may be possible to releasably position the tape onto an uncured layer prior to application of an upper layer, but the advantage gained would be quite small in view of the labor involved and of possible movement of the tape on the uncured surface resulting in miss-shaped grout lines.

FIGS. 9 and 9A schematically illustrate the random application of the second liquid mortar 142 onto the surface of the taped and cured 140 first liquid mortar 130 as illustratively applied at FIG. 9. The second liquid mortar 142 contains the same components of the first liquid mortar 130. A contrasting color pigment 144 relative to color pigment 122 or the first liquid mortar 130 without a color pigment. A contrasting pigment 122,144 is added and mixed to at least one of the first 130 and second 142 mortars such that one of the first 130 and second 142 mortars has a color which contrasts with the color of the other one of the first 130 and second 142 mortars to enhance the visual perception of the ceramic appearance. The second liquid mortar 142 is applied to randomly spaced portions 141 of the taped and cured first coating 140 to form a noncontiguous coating 148. The noncontiguous coating 148 is described as a plurality of specks or blotches 150 partially covering the cured first coating 140. As illustrated in FIG. 7, the smooth 134 first coating 136 is a thin film which contiguously and evenly covers the entire surface of the substrate 114. Whereas the noncontiguous coating which forms the plurality of interconnecting 145 and non-interconnecting 147 flattened and level plateaus or blotches partially covers the cementitious substrate. The noncontiguous coating is randomly shaped and is about ⅛ of an inch thick prior to troweling. Since the viscosity of the second liquid mortar is high, resembling very thick pancake batter, it does not spread over the surface of the cementitious substrate without troweling.

FIGS. 10 and 10A schematically illustrate the troweled second liquid mortar 146 or noncontiguous thickened cementitious coating to form a plurality of interconnecting and non-interconnecting flattened and level plateaus partially covering the cementitious substrate to provide flattened speckles partially covering the cementitious substrate. The second liquid mortar 146 coats over portions of the cured 140 first liquid mortar 130 or in the event a first cured liquid mortar is not used, partially coats over the cementitious substrate. FIG. 10 further schematically illustrates the surface of the invention 110 with the tape 138 removed from the cured, troweled noncontiguous coating 158. The removal of tape 138 reveals the cured contiguous coating thereunder to simulate cementitious grout-lines 160 between the simulated mottled and speckled ceramic surface of ceramic tile 162. The cured coating may be described as the cementitious substrate partially covered with a flattened and shaped pattern over the cementitious substrate simulating a mottled, speckled ceramic covering. If tape is applied the cured coating of the substrate may be described as a cementitious substrate partially covered with a flattened and shaped pattern over the cementitious substrate simulating a mottled, speckled ceramic tile and to reveal the cementitious substrate representing grout lines where the second mortar covered the tape to yield grout lines of the cementitious substrate simulating a plurality of mottled and speckled ceramic tiles. In each application the troweled second liquid mortar forming the flattened and shaped pattern is elevated relative to the cementitious substrate. That is, the troweled second mortar results in plateaus rising above the surface of the cementitious substrate.

FIGS. 11 and 11A schematically illustrate the application of a sealer 150 to the cured surface 156. The sealer protects the secured cementitious surface by including stain resistants, sunscreens, sealants and the like in the composition.

Preferably, the proportions of the components of the first and second mixtures are about 1 part cement to about 2 parts sand. The preferred cement is portland cement and the most preferred portland cement is white portland cement since white portland cement produces the most color brilliance and requires less pigment than the darker cements. Masonry cement may be used, however, it contains lime which may weaken the resulting surface. A complete mixture of sand and cement is available from Seamco Laboratories of Tampa, Fla. under the trademark FLOCRETE which is the most preferred mixture.

The aqueous solutions of acrylic resins are readily available from Union Carbide available under the trademarks UCAR 503, UCAR 380 and UCAR 505 and from Rohm and Haas available under the trademarks RHOPLEX AC64, AC 490 and AC 507.

The colorant pigments are readily available from Nuodix, G P Colortund, Universal Color Dispersion Co., Cardinal Color Co. and UCD Universal Colorant and from other suppliers known in the art.

The second liquid mortar is prepared by mixing sand and cement with the aqueous solution of an adhesive resin in a ratio of about 10 pounds of resin solution to about 50 pounds of sand and cement mix which gives a fluid consistency or flowability of a thick pancake batter to the mortar. The mortar, which may include a colorant, is completely mixed to insure complete dispersion of the ingredients such that the resulting mortar will pour or spray without separation of the ingredients.

The first liquid mortar is prepared the same way as the second liquid mortar, except that a greater amount of adhesive resin is used in the first liquid mortar in order to lower the viscosity of the resulting composition. A lower viscosity enables application of the first liquid mortar by a squeegee, sponge or the like.

By way of example and for illustration the process for covering an existing concrete slab, such as a driveway, includes cleaning the surface of the concrete slab by degreasing and preparing the surface for bonding by applying an acid-etching solution to the surface of the concrete. An aqueous solution of hydrofluoric acid is preferred. This solution is diluted with water up to about 3:1 (water to acid), or used full strength, and evenly applied to the slab surface in a manner well known to those in the art. The spent acid solution is then washed off by spray washing the surface with water, forced upon the surface under combined water and air pressure to provide an enhanced cleansing action upon the surface. The first liquid mortar may be applied to the surface of the concrete while it is still damp thereby enhancing the bonding between the concrete and the mortar. The first liquid mortar may also be applied to a dry surface.

Portland cement, preferably white portland cement, and sand, specifically mortar sand which is a very fine powder-like sand, is mixed at the preferred ratio of 2 parts sand to 1 part cement forming a first mixture. A second mixture is prepared the same way as the first mixture. A contrasting color pigment is added to either of or both of the first and/or second mixture to enhance the visual perception of the speckle and the color gradations radiating therefrom. An aqueous solution of an adhesive resin, such as an acrylic resin is then added at a ratio of about 10 pounds of resin solution to about 50 pounds of sand and cement mix to both the first and second mixtures to prepare a first and second liquid mortar, respectively. The first liquid mortar is then further diluted with the adhesive resin in order to lower the viscosity such that the first liquid mortar may be squeegeed onto the concrete surface using a squeegee applicator, known in the art, to produce a smooth contiguous cementitious coating over the entire surface of the concrete slab.

Once the first liquid mortar has cured, tape is releasably secured to the contiguous coating in any desired pattern. The tape represents the grout outline surrounding grouted tile. Preferably, the tape comprises an elongate strip-shape having straight edges as illustrated at FIG. 8.

The second liquid mortar is randomly and preferably sprayed onto the contiguous coating using a Kraft Texture Gun, at about 15-22 psi pressure, which mixes the mortar and air to produce a noncontiguous coating. The resultant sprayed surface or coat may be best described as a plurality of specks or blotches upon portions of the taped contiguous coating.

Prior to the complete curing of the second liquid mortar the entire surface of the coated substrate is troweled to form a plurality of non-interconnecting and interconnecting, flattened level plateaus partially covering the cementitious substrate.

After the cementitious surface is completely cured the tape is removed to reveal the cured first liquid mortar thereunder to simulate cementitious grout-lines between tiles thereby simulating a tiled surface having a ceramic appearance.

The cured cementitious surface may be coated with a protectant coating, such as an epoxy based coating, either before removing the tape or after the tape is removed. While the time for curing is dependant upon temperature and humidity, generally about 20 minutes after trowelling is sufficient.

GOLD SIMULATED CERAMIC WITH A MOTTLED SPECKLED APPEARANCE

A skim coat (watery or having viscosity approximate water) of the natural (color) Design Flo-Crete mix is applied to the surface of the hardboard and allowed to cure. The Flo-Crete additive is stirred and 18 or 20 cups of Seamco's Flo-Crete adhesive additive is measured into a clean, dry 5 gallon bucket. Add 50# bag of Seamco's dry mix to the additive, slowly while mixing. Mix at a low speed for approximately 4 minutes. Blend into the mix two fluid ounces of gold Kolor Kote concentrate per about 5 gal. of dry mix to achieve the desired color. Let mix sit for 5 minutes, re-mix again for 1 minute.

Fill hopper-sprayer with mix and apply evenly to surface covering approximately 70% of the total surface so as to not obliterate the underlying skim coated cementitious substrate. The noncontiguous thickened cementitious coating is troweled to form a plurality of gold interconnecting and non-interconnecting, flattened and level plateaus partially covering the natural cementitious substrate to provide flattened raised speckles partially covering the cementitious substrate. The troweled coating is allowed to cure to reveal the cementitious substrate partially covered with a flattened and shaped pattern over the cementitious substrate simulating a mottled, speckled ceramic tile and to reveal the cementitious substrate representing grout lines where the second mortar (gold) covered the tape to yield grout lines of the cementitious substrate simulating a plurality of mottled and speckled ceramic tiles. The surface is allowed to cure. After curing, the tape is removed. The surface is then lightly scraped if needed, to remove any burrs or loose material and coated with a protectant coating. Strips of tape may also be used in the manner described above to attain a ceramic tiled appearance.

FIGS. 12-16 show a simulated marble product and process similar to that just described but differing in that the color pigments are added to the liquid mortar and air pressure is utilized to swirl the pigment into the surface of the mortar prior to the curing process thereby producing a product which is smooth and marble-like without the necessity of troweling the surface.

Figure 12:
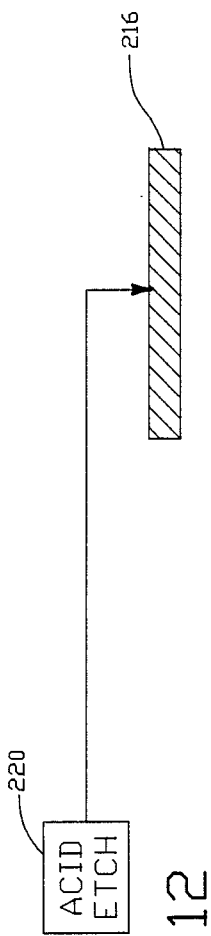
FIG. 12 schematically illustrates the acid etching of a substrate prior to applying a mortar to the substrate surface.

FIG. 12 shows substrate 216 which is acid-etched using process 220 as defined above with respect to processes 20 and 120.

Figure 13:
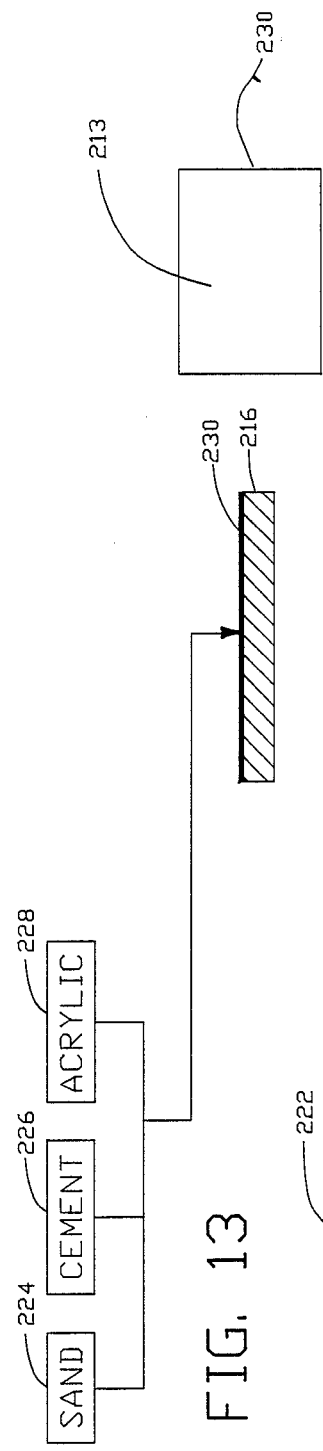
FIG. 13 schematically illustrates the application of the liquid mortar to the substrate.

In FIGS. 13 and 13A, sand 224 is mixed with cement 226 and acrylic 228 and applied as a mortar 230 over acid-etched substrate 216. The composition of the sand-cement-acrylic mixture is as discussed above and can advantageously be a fifty-pound bag of the product called FLO-CRETE mixed with 18-20 cups of additive in a five gallon pail. Ideally, the mixture should have a viscosity such that it flows and settles very easily into a smooth surface. In one example, the viscosity is such that if substrate 216 were to be tipped at an angle, the mortar would run over the side in a mass, but if substrate 216 is held then the mortar would remain on the top surface and form a thickness which would eventually cure to form a hard layer attached to the substrate.

Figure 14A:
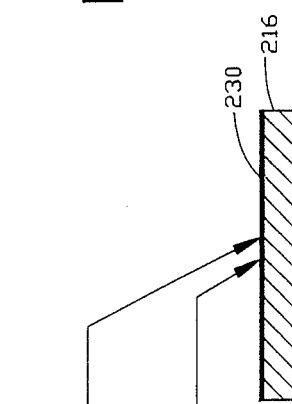
FIG. 14A is a plan view of FIG. 14.
Figure 14:
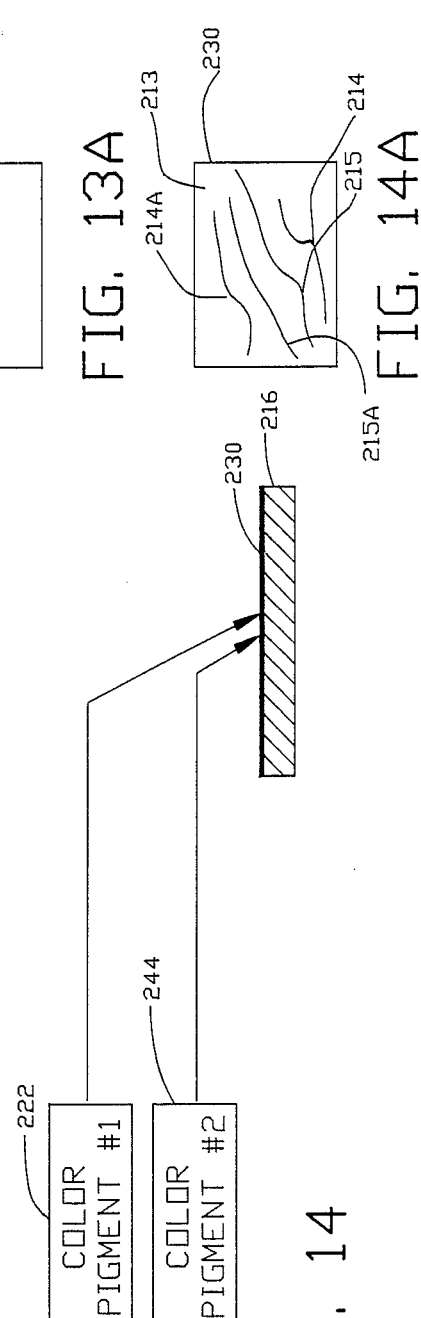
FIG. 14 schematically illustrates the application of at least one color to the mortar.

In FIGS. 14 and 14A, color pigment 222 is added to mortar 230 as dollops of color. These dollops, shown as lines 214 and 214A, can be placed on the substrate as dots or as lines as shown. FIG. 14 shows a second color 244 also being applied to substrate 216, and appearing as swirls 215 and 215A. In one embodiment, a paddle is dipped into each color pigment and the end of the paddle (not shown) is placed in contact with the top surface of mortar 230 thereby imparting the color dollop to mortar 230. The second color dollop could be placed in proximity to the first color dollops or can be placed at other locations. The amount of the color pigment in each dollop can be varied to give the desired result. Of course, any number of dollops may be used, any pattern may be generated and any number of colors can be applied.

In FIGS. 15 and 15A, after the color dollops have been added to mortar 230, air source 300 is utilized ideally at a pressure of fifteen pounds per square inch (15 psi). Air 311 emerges from end 310, which is held approximately twelve inches from the top surface of mortar 230, and is directed against the surface of liquid mortar 230. Preferably, the air is directed and at acute angle relative to the surface of the liquid mortar 230. Air stream 311 causes the liquid color pigment contained in the dollops to begin to move along and within the surface of mortar 230 causing an uneven dilution of color. When more than one color is used, a blending of the colors from the various color dollops can occur. Moving the air stream continuously disperses the color deeper into mortar 230. As the process continues, more color dollops can be added by the same process, i.e. by dipping a paddle into the color pigment and placing the color anywhere on surface 230. This process of adding color pigments can take place even while the air stream is being directed to mortar 230.

Using this process, the color begins to swirl though the mortar in different patterns and varying intensities thereby giving a realistic marble appearance to the resulting product without requiring troweling. The resulting product has veins of color 214, 214A, 215, 215A streaked through it at various depths in much the same manner as does marble. Since, in addition to varying the color of the dollops, the base color of the liquid mortar may be varied, a product is achieved which has all the color properties of naturally-occurring marble or even granite.

Preferably, the force of the air stream 311 is insufficient to cause splattering of the liquid mortar 230 but does cause a depression 232 proximate the air stream and an elevation of the liquid mortar 234 adjacent to the depression 232. When the air stream 311 is turned off, the selected viscosity of the liquid mortar surface 230 enables the areas of elevation 234 to flow into the area of depression 232 to self level the surface 230. Furthermore, the mortar surface 230 settles into a smooth finish and, as shown in FIGS. 16 and 16A, a sealant can be added to seal the top surface in the manner previously discussed.

Note that for clarity purposes the color swirls 214, 214A, 215 and 215A are shown as separate lines. In actuality, the colors from each of these swirls can be made to intermix under control of air stream 311 thereby giving a blending effect controlled by the operator of nozzle 310. Also note that nozzle 310 may be hand-held and moved about or it can be fixed and the mortar surface can be made to move under the air stream. Movement control 301 can operate to push-pull substrate 216 in any direction as well as to control the positioning of head 310. Nozzle 310 can be computer controlled and can be operated in conjunction with the movement of mortar surface 230 to give either unique surfaces or repeated surfaces. Color can, or course, be added by hand as discussed above, or automatically by dripping or by a continuously fed paddle. Under such a process a facility can be built to give a continuous output of a marble-like material having no seams.

The present disclosure includes that contained in the appended claims as well a that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A process for covering a substrate with a simulated marble surface comprising:
   mixing cement and sand to form a first mixture;
   adding an aqueous solution of an adhesive resin to the first mixture to create a liquid mortar;
   applying the liquid mortar onto the substrate to form a layer on the substrate;
   adding at least one pigment dollop of at least one color to the layer prior to the complete curing of the layer; and
   directing a stream of air to the layer to cause the pigment dollop to blend into the mortar to form color patterns through the layer.

2. The process of claim 1 further including applying a clear coating to seal and protect the resulting simulated marble surface against accelerated aging caused by sun and water.

3. A process as in claim 2 wherein the clear coating is selected from the group consisting of acrylics, epoxides, and urethanes.

4. The process of claim 1 wherein the substrate is selected from the group consisting of concrete, wood, hardboard and masonry.

5. The process of claim 1 wherein the substrate is selected from the group consisting of concrete, wood, hardboard and masonry; and
   the concrete is acid-etched prior to applying the liquid mortar in order to provide bonding between the concrete substrate and the mortar.

6. The process of claim 1 wherein pigment dollops of one color are applied at random locations on said layer.

7. A process for covering a substrate with a simulated marble surface comprising:
   mixing cement and sand to form a first mixture;
   adding an aqueous solution of an adhesive resin to the first mixture to create a liquid mortar;
   applying the liquid mortar onto the substrate to form a layer on the substrate;
   adding a plurality of pigment dollops of differing colors to the layer prior to the complete curing of the layer; and
   directing a stream of air to the layer to cause the plurality of pigment dollops to blend with each other and to blend into the mortar to form multiple color patterns through said layer.

8. The process of claim 1 wherein said pigment dollop is applied mechanically by dipping a paddle end in a source of pigment and then touching the paddle end to said layer.

9. The process of claim 1 wherein said pigment dollop is applied by spraying.

10. The process of claim 1 wherein said pigment dollop is applied by dripping a color pigment from a source of said pigments.

11. The process of claim 1 wherein said pigment dollop is a liquid applied during said air directing step.

12. A process for covering a substrate with a simulated marble surface comprising:
    adding an aqueous solution of adhesive resin to cement and sand to create a liquid mortar;
    applying said liquid mortar onto the substrate to form a layer on said substrate;
    applying pigment of at least one color to said layer prior to the complete curing of said layer; and
    directing a stream of air to said layer to cause any applied pigment to disperse through said layer.
    directing a stream of air to said layer to cause the pigment to blend into the mortar to form color patterns through said layer.

13. The process of claim 12 wherein said pigment is applied at random locations on said layer.

14. The process of claim 12 wherein a plurality of different color pigments are applied to said layer prior to the complete curing of said layer.

15. The process of claim 12 wherein said pigment is a liquid and applied mechanically by dipping a paddle end in a source of pigment and then touching the paddle end to said layer.

16. The process of claim 12 wherein said pigment is applied by spraying.

17. The process of claim 12 wherein said pigment is applied by dripping color pigments from a source of said pigments.

18. The process of claim 12 wherein said pigment is a liquid applied during said air stream directing step.

19. The process of claim 12 further including applying a clear coating to seal and protect the simulated marble surface against accelerated aging caused by sun and water.

20. A process as in claim 19 wherein the clear coating is selected from the group consisting of acrylics, epoxides, and urethanes.

21. The process of claim 12 wherein the substrate is selected from the group consisting of concrete, wood, hardboard and masonry.

22. The process of claim 21 wherein the concrete substrate is acid-etched prior to applying the first mixture in order to provide bonding between the concrete substrate and the first liquid mortar of the lower layer.

23. The process of claim 12 wherein said air stream directing step includes moving said substrate under said directed stream of air.

24. The process of claim 12 wherein said air stream directing step includes moving said air stream across the surface of said substrate.

* * * * *